(12) United States Patent
Bae

(10) Patent No.: US 6,467,129 B1
(45) Date of Patent: Oct. 22, 2002

(54) FRICTION HINGE DEVICE

(76) Inventor: Heun-Jong Bae, Yangji maeul Kumho Apt. 301-1503, Sunae-dong 27, Budang-ku, Seongnam-si, Kyungki-do (KR)

( * ) Notice: Subject to any disclaimer, the term of this patent is extended or adjusted under 35 U.S.C. 154(b) by 0 days.

(21) Appl. No.: 09/574,916

(22) Filed: May 19, 2000

(30) Foreign Application Priority Data

May 20, 1999 (KR) .............................................. 99-8668

(51) Int. Cl.[7] .............................................. E05D 11/08
(52) U.S. Cl. .............................. 16/342; 16/308; 16/337
(58) Field of Search ........................... 16/342, 337, 347, 16/338, 339, 257, 308, 300, 303, 284; 296/97.12, 97.13; 188/83

(56) References Cited

U.S. PATENT DOCUMENTS

| | | | | |
|---|---|---|---|---|
| 4,485,522 A | * | 12/1984 | Chen .............................. | 16/54 |
| 5,026,108 A | * | 6/1991 | Leahy ...................... | 296/97.11 |
| 5,406,678 A | * | 4/1995 | Rude et al. .................... | 16/342 |
| 5,491,874 A | * | 2/1996 | Lowry et al. .................. | 16/342 |
| 5,500,982 A | * | 3/1996 | Hosoi ........................... | 16/297 |
| 5,542,505 A | * | 8/1996 | Kempf ..................... | 188/77 W |
| 5,697,125 A | * | 12/1997 | Gannon .......................... | 16/36 |
| 5,771,539 A | * | 6/1998 | Wahlstedt et al. ............. | 16/285 |
| 5,918,348 A | * | 7/1999 | Carpenter et al. ............. | 16/342 |
| 5,940,936 A | * | 8/1999 | Lu ................................ | 16/337 |
| 6,035,491 A | * | 3/2000 | Hartigan et al. ............... | 16/342 |

\* cited by examiner

*Primary Examiner*—Anthony Knight
*Assistant Examiner*—Mark Williams
(74) *Attorney, Agent, or Firm*—Alston & Bird LLP

(57) ABSTRACT

A friction hinge device includes a housing, and a torsion spring held fixed within the housing. The torsion spring has an outer surface with a predetermined diameter, an inner surface differentiating in diameter, and a breakthrough hole defined by the inner surface. The outer surface of the torsion spring has a protrusion. The inner surface of the torsion spring is formed with a pair of first diameter portions facing to each other and second diameter portions disposed between the first diameter portions. The second diameter portion has a diameter greater than the diameter of the first diameter portion. A shaft bar is fitted into the breakthrough hole of the torsion spring such that a center portion of the shaft bar tightly contacts the first diameter portion of the torsion spring.

1 Claim, 5 Drawing Sheets

FRICTION HINGE DEVICE

RELATED APPLICATION

This application is based on and claims priority from Korean Utility Model Application No. 99-8668 filed on May 20, 1999, the contents of which are incorporated herein by reference.

BACKGROUND OF THE INVENTION (a) Field of the Invention

The present invention relates to a friction hinge device and, more particularly, to a clip type friction hinge device which can effectively control frictional volume with a minimized size.

(b) Description of the Related Art

Generally, a friction hinge device is to keep one rotating body at a predetermined position based on the frictional force working between the rotating body and a second body standing in a contact relation to the rotating body For instance, such a friction hinge device may be used for controlling screen angles of notebook computer monitors or for controlling the positions of sun-visors of automobiles. The frictional force working between the rotating body and the second body can be given with multiplication of the frictional volumes of the two bodies by the force applied to the rotating body in an axial direction.

In view of the ways of generating such a frictional force, there are various types of friction hinge devices. Among them, a wrap spring type where the frictional force is generated between a shaft and a spring wrapped around the shaft, a shaft disk compression type where a circular friction plate is mounted over the shaft, and a U-shaped clip type where a shaft is pressed against a multi-plated U-shaped spring have been extensively used.

In the wrap spring type, the processing steps may be simplified at a relatively lower cost. However, in such a type, the frictional force is determined depending upon the processing degree of the end portions of the spring. Thus, in order to make a high-quality friction hinge device, production cost should be increased. Furthermore, the amount of backlash is susceptible to the combination state of the end portions of the spring, and a separate support for supporting the shaft and the spring should be externally provided. This results in increased device size.

In the shaft disk compression type, it is easy to install a unit for controlling the force to be applied to the shaft in the axial direction. However, when the device size is decreased, the frictional volume is also decreased. Thus, it becomes impossible to use such a friction hinge device for a large torque application. Furthermore, leakage of lubricant is liable to occur, and hence, long-term durability of the device cannot be expected.

In contrast, in the U-shaped clip type, the frictional force is determined depending upon the number of the spring plates so that various kinds of friction hinge devices capable of producing large range of torque can be easily made.

FIG. 1 illustrates a U-shaped type friction hinge device according to a prior art. As shown in FIG. 1, the friction hinge device 100 includes a housing 130, and a U-shaped clip 110 held fixed within the housing 130. The U-shaped clip 110 is provided with first and second arms 112 and 114, and an empty portion 116 defined by the first and second arms 112 and 114. A shaft bar 120 is disposed at the empty portion of the U-shaped clip 110. The housing 130 may be fixed to a body of a notebook computer.

The clip 110 is pressed against the shaft bar 120 in the axial direction to thereby generate the required frictional force.

Specifically, when the shaft bar 120 contacting the clip 110 is forced to be rotated in a clockwise or an anti-clockwise direction, it does not rotate at the relatively early stage because the static frictional force working between the clip 110 and the shaft bar 120 is greater than the rotational force applied to the shaft bar 120. As the rotational force of the shaft bar 120 becomes so increased as to outweigh the static frictional force, the shaft bar 120 starts to be rotated.

When the shaft bar 120 is rotated by a predetermined angle and the rotational force applied thereto is released, the rotation of the shaft bar 120 is interrupted, and the shaft bar 120 is kept at that state due to the frictional force working between the shaft bar 120 and the clip 110.

However, in the above structured U-shaped clip type friction hinge device, there exist several problems like the below.

First, in order to generate the desired frictional force, the force applied to the shaft in the axial direction should be altered while not controlling the frictional volume. Therefore, the pressurizing force against the shaft is constantly maintained even at the relative rotation of the shaft and the U-shaped clip. In this situation, relatively large force should be required to operate the shaft, and the rotation of the shaft cannot be made in a fluent manner, resulting in abrasion of the friction interface.

Furthermore, since the shaft is in a fixed contact with the clip, the abrasion of the friction interface becomes so serious that the pressurizing force against the shaft is radically decreased. Consequently, the combination relation between the shaft and the clip becomes weak in a relatively short time interval, resulting in reduction in cycle life of the device.

In addition, as the clip has an empty portion and both end portions of the device are in an opening state, leakage of lubricant is liable to occur.

SUMMARY OF THE INVENTION

It is an object of the present invention to provide a friction hinge device which can freely control the friction volume while reducing the abrasion of the friction interface.

This and other objects may be achieved by a friction hinge device with a housing, and a torsion spring held fixed within the housing.

The torsion spring has an outer surface with a predetermined diameter, an inner surface differentiating in diameter, and a breakthrough hole defined by the inner surface. The outer surface of the torsion spring has a protrusion. The inner surface of the torsion spring is formed with a pair of first diameter portions facing to each other and second diameter portions disposed between the first diameter portions. The second diameter portion has a diameter greater than the diameter of the first diameter portion. The torsion spring is formed with a plurality of plate segments sequentially attached to each other.

The housing has an inner surface spaced apart from the outer surface of the torsion spring with a predetermined distance, and a groove for receiving the protrusion of the torsion spring in a tight manner.

A shaft bar is fitted into the breakthrough hole of the torsion spring such that a center portion of the shaft bar tightly contacts the first diameter portion of the torsion spring.

The friction hinge device may further include end caps provided within the housing at both sides of the torsion spring, bearings internally provided at side end portions of the housing to support the shaft bar, and friction plates fitted between the second diameter portions and the shaft bar such that the friction plates are pressed against the shaft bar.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
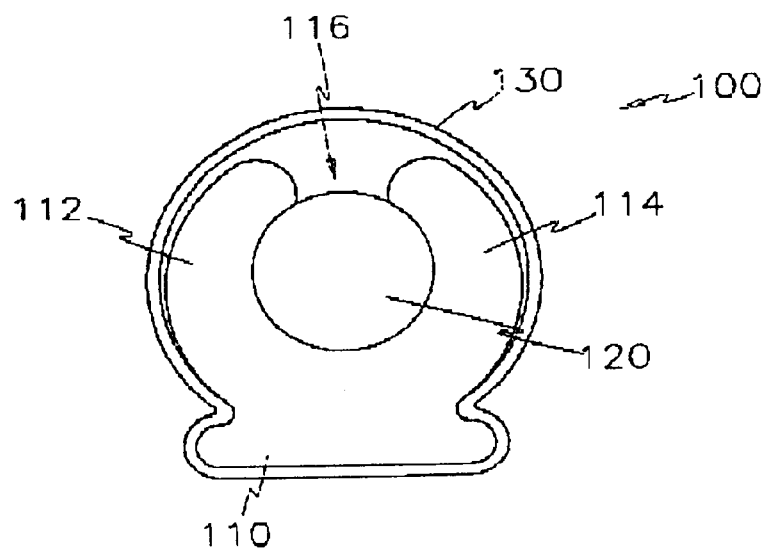
FIG. 1 is a schematic view of a friction hinge device according to a prior art.
Figure 2:
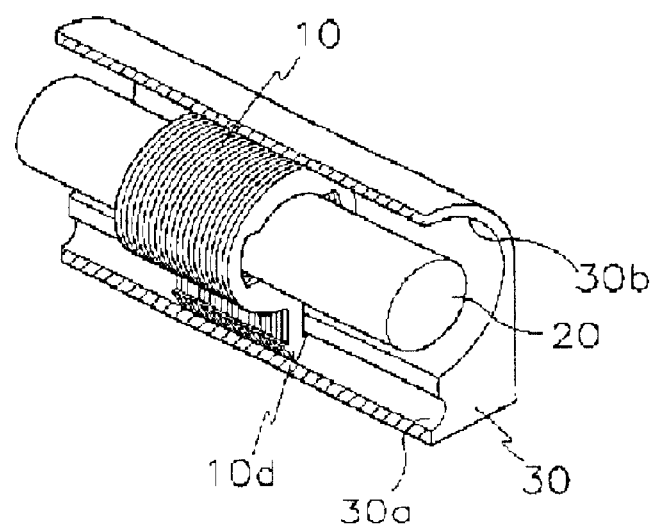
FIG. 2 is a partial elevation view of a friction hinge device according to a first preferred embodiment of the present invention.
Figure 3A:
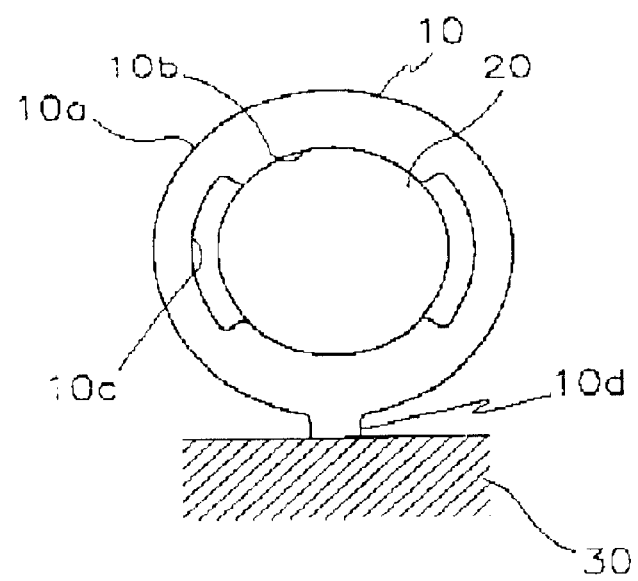
FIG. 3A is a view illustrating the initial state of the friction hinge device shown in FIG. 2.
Figure 3B:
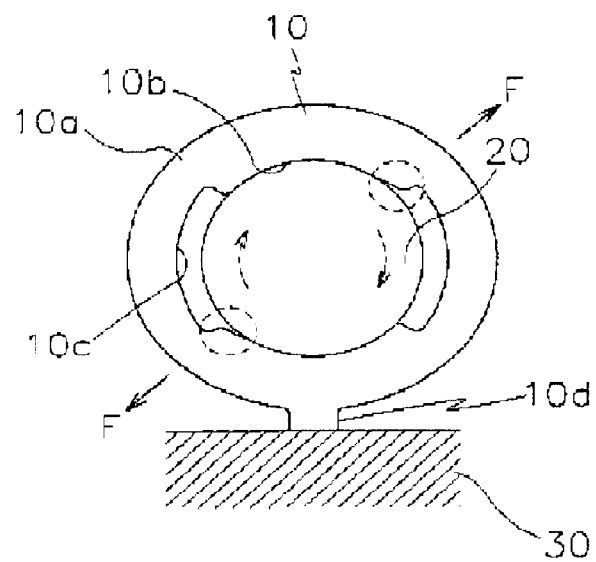
FIG. 3B is a view illustrating the operational state of the friction hinge device shown in FIG. 2.
Figure 4:
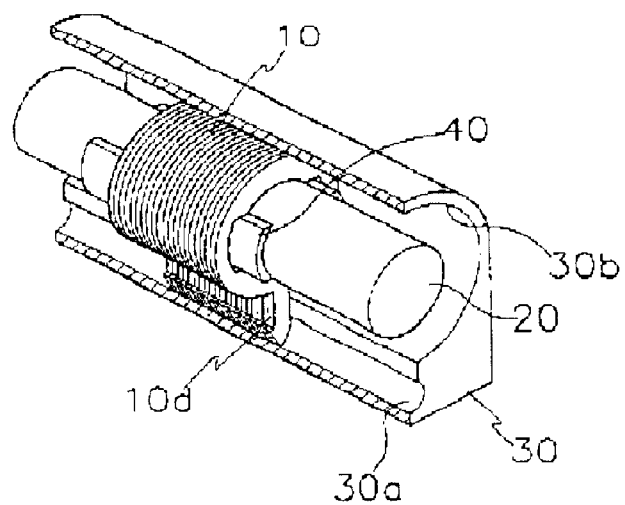
FIG. 4 is a partial elevation view of a friction hinge device according to a second preferred embodiment of the present invention.
Figure 5:
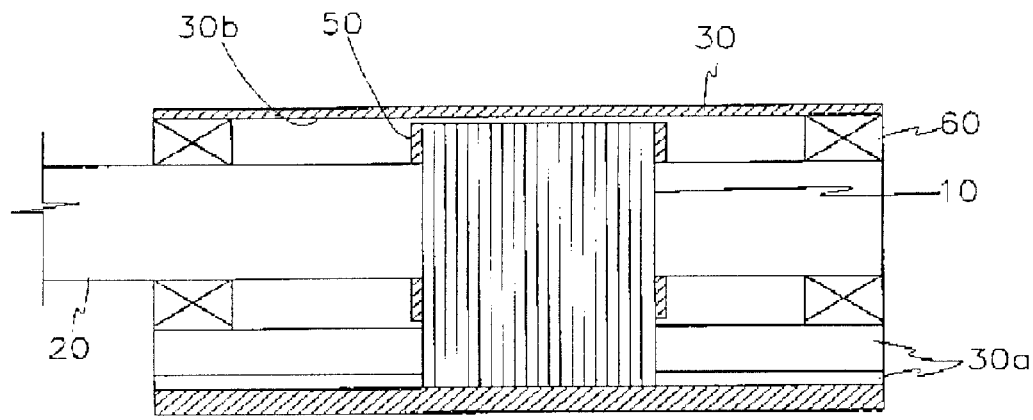
FIG. 5 is a cross sectional view of the friction hinge device shown in FIG. 4.

FIG. 2 illustrates a friction hinge device according to a first preferred embodiment of the present invention, and FIGS. 3A and 3B illustrate the initial and the operational states of the friction hinge device, respectively.

As shown in FIG. 2, the friction hinge device includes a housing 30, and a torsion spring 10 held fixed within the housing 30. The torsion spring 10 is structured with a plurality of plate segments that are sequentially attached to each other.

The torsion spring 10 has an outer surface 10a having a predetermined diameter, an inner surface differentiated in diameter, and a breakthrough hole defined by the inner surface. The inner surface of the torsion spring 10 is formed with a pair of first diameter portions 10b facing to each other, and second diameter portions 10c disposed between the first diameter portions 10b. The second diameter portion 10c has a diameter greater than that of the first diameter portion 10b. An arrow-shaped protrusion 10d is protruded from the outer surface 10a of the torsion spring 10.

When combined with the housing 30, the outer surface 10a of the torsion spring 10 is spaced apart from an inner surface 30b of the housing 30 with a predetermined distance to allow the twisting operation of the torsion spring 10 in a fluent manner. The housing 30 has an inner groove 30a. and the arrow-shaped protrusion 10d of the torsion spring 10 is held fixed within the groove 30a.

A shaft bar 20 is fitted into the breakthrough hole of the torsion spring such that the center portion thereof tightly contacts the first diameter portion 10b.

In combination with the shaft bar 20, the first diameter portion 10b of the torsion spring 10 exerts contact force perpendicularly to the shaft bar 20, whereas the second portion 10c twists during the rotating movement of the shaft bar 20 to thereby generate compression force.

In order to produce the above-structured torsion spring 10, an aluminum or steel-based plate is first processed through blanking or photolithography to thereby form the desired number of plate segments. The plate segments are so heat-treated as to bear the required kinetic potential, and attached to each other in a sequential manner.

The photolithography technique may be used when it is required to make mini-sized torsion springs or uniform-surfaced torsion springs.

The above structure makes it possible that the frictional force can be freely controlled through varying the number of the plate segments.

In operation, as shown in FIG. 3B, the shaft bar 20 is forced to be rotated in a clockwise direction. Instead, the housing 30 may be rotated in an anti-clockwise direction. In the beginning, since the static frictional force working between the first diameter portion 10b of the torsion spring 10 and the shaft bar 20 is greater than the rotational force of the shaft bar 20, the shaft bar 20 does not rotate. When the rotational force of the shaft bar 20 becomes so increased as to go beyond the static frictional force, the shaft bar 20 starts to rotate so that kinetic frictional force works in a direction tangent to the circular outline of the shaft bar 20, and repulsive force F works in a direction perpendicular to the tangential direction.

At this time, as indicated in FIG. 3B by a circular dotted line, the first diameter portions 10b of the torsion spring 10 twist at their frontal ends due to the repulsive force F. The frictional volume of the first portion 10b of the torsion spring 10 and the shaft bar 20 is reduced due to the twisted area so that the pressurizing force of the first portion 10b against the shaft bar 20 is reduced.

The twisting operation of the torsion spring 10 becomes continued till the sum of the compression force applied to the second diameter portions 10c due to the repulsive force F and the twist-restraining force becomes equal to the repulsive force F In this way, the shaft bar 20 can be rotated with relatively lower driving force.

When the rotation of the shaft bar 20 is interrupted, the shaft bar 20 is stably kept at that state due to the pressurizing force of the first diameter portions 10b of the torsion spring 10 against the shaft bar 20.

FIGS. 4 to 6B illustrate a friction hinge device according to a second preferred embodiment of the present invention.

In this preferred embodiment, other components of the friction hinge device are the same as those related to the first preferred embodiment except that friction plates 40 are forcefully fitted between the second portions 10c of the torsion spring 10 and the shaft bar 20, end caps 50 are provided within the housing 30 at both sides of the torsion spring 10 to prevent leakage of lubricant, and bearings 60 are internally mounted at both end portions of the housing 30 while supporting the shaft bar 20.

Figure 6A:
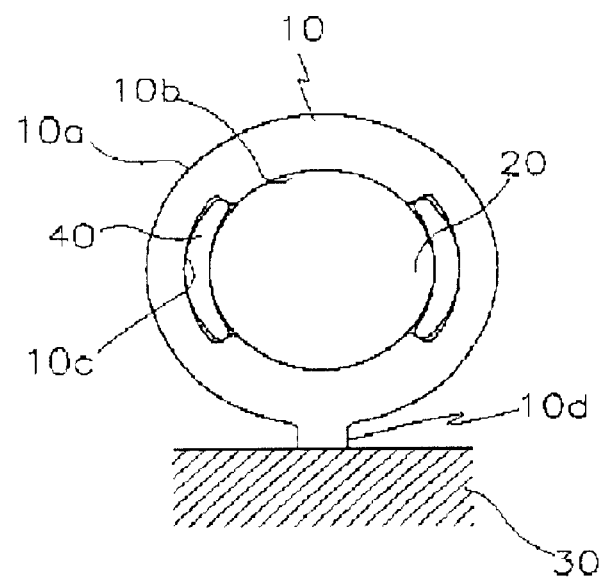
FIG. 6A is a view illustrating the initial state of the friction hinge device shown in FIG. 4.
Figure 6B:
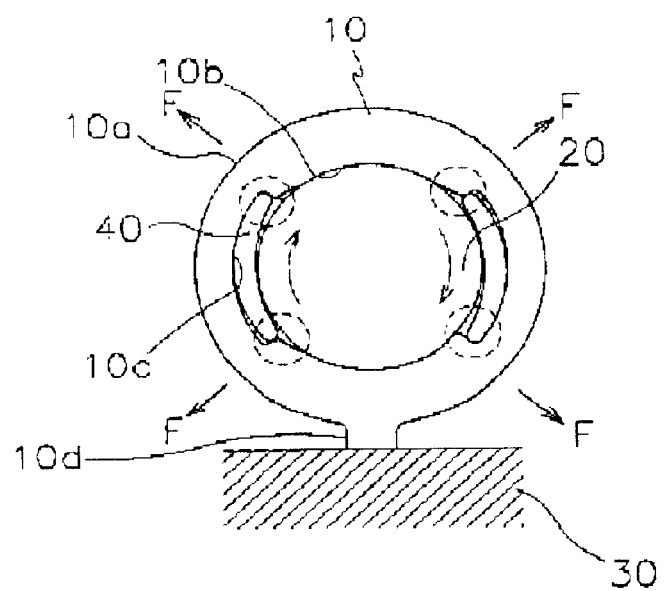
FIG. 6B is a view illustrating the operational state of the friction hinge device shown in FIG. 4.

In the above structure, the friction plates 40 also serves to exert the required static and kinetic frictional forces together with the first diameter portions 10b of the torsion spring 10. Furthermore, as indicated in FIG. 6B by a circular dotted line, the twisting due to the repulsive force F is generated at the frontal end portions of the friction plates 40 and the first diameter portions 10b. This gives similar effects to those related to the first preferred embodiment.

Furthermore, the above structure makes it possible that relatively large frictional force can be obtained while reducing the device size.

In addition, the possible leakage of lubricant during the rotating movement of the shaft bar 20 can be prevented with the end caps 50, and the abrasion of the friction interface can be reduced with the bearings 60 supporting the shaft bar 20.

Figure 7:
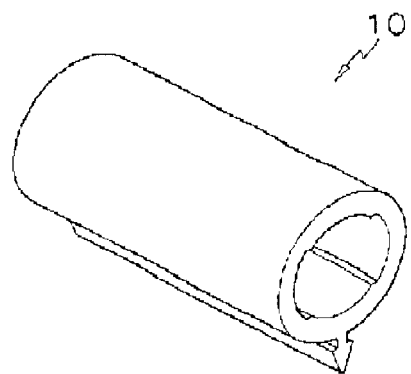
FIG. 7 is a perspective view of a torsion spring for a friction hinge device according to a third preferred embodiment of the present invention.

Alternatively, as shown in FIG. 7, the torsion spring 10 may be formed with a different structure. An aluminum or steel-based tube with a shape similar to the above-described torsion spring 10 is first made through casting, and cut away by a predetermined length. Thereafter, the resulting tube is so surface-hardened as to bear the desired kinetic potential for acting as a torsion spring.

As described above, in the inventive friction hinge device, the frictional volume is freely controlled so that the abrasion of the friction interface can be reduced while requiring relatively lower driving force.

Furthermore, the device size can be significantly reduced while exerting relatively great frictional force, and leakage of lubricant can be completely prevented.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A friction hinge device comprising:

a housing comprising an inner surface and a groove;

a torsion spring held fixed within the housing, the torsion spring being formed with a plurality of plate segments, the plate segments being sequentially attached to each other, the torsion spring having an outer surface with a predetermined diameter, an inner surface differentiating in diameter, and a breakthrough hole defined by the inner surface, the outer surface of the torsion spring having a protrusion, the inner surface of the torsion spring having a pair of first diameter portions facing to each other and second diameter portions disposed between the first diameter portions, the second diameter portion having a diameter greater than the diameter of the first diameter portion, the housing being spaced apart from the outer surface of the torsion spring with a predetermined distance, and the groove of the housing adapted to receive the protrusion of the torsion spring in a tight manner;

a shaft bar fitted into the breakthrough hole of the torsion spring such that a center portion of the shaft bar tightly contacts the first diameter portion of the torsion spring;

bearings internally provided at side end portions of the housing to support the shaft bar;

friction plates fitted between the second diameter portions and the shaft bar such that the friction plates are pressed against the shaft bar; and end caps provided within the housing at both sides of the torsion spring.

* * * * *